United States Patent [19]

Matthews et al.

[11] Patent Number: 4,491,652
[45] Date of Patent: Jan. 1, 1985

[54] SEQUENTIALLY PREPARED THERMOPLASTIC ELASTOMER AND METHOD OF PREPARING SAME

[75] Inventors: Demetreos N. Matthews, Bethany; Walter Nudenberg, Newtown, both of Conn.

[73] Assignee: UNIROYAL, Inc., Middlebury, Conn.

[21] Appl. No.: 372,461

[22] Filed: Apr. 29, 1982

Related U.S. Application Data

[63] Continuation-in-part of Ser. No. 263,236, May 13, 1981, abandoned.

[51] Int. Cl.³ .......................................... C08F 297/08
[52] U.S. Cl. .................................... 525/247; 525/323
[58] Field of Search ................. 524/570; 525/247, 323

[56] References Cited

U.S. PATENT DOCUMENTS

| | | | |
|---|---|---|---|
| 3,318,976 | 5/1967 | Short | 260/878 |
| 3,378,606 | 4/1968 | Kontos | 260/878 |
| 3,642,746 | 2/1972 | Koshiwa et al. | 260/88.2 |
| 3,732,335 | 5/1973 | Hermans | 260/878 B |
| 3,798,288 | 3/1974 | McMannie et al. | 260/878 B |
| 3,853,969 | 12/1974 | Kontos | 260/42.46 |
| 3,954,704 | 5/1976 | Verne et al. | 260/878 B |
| 3,970,719 | 7/1976 | Edmonds | 260/878 B |
| 4,013,823 | 3/1977 | Longi et al. | 526/166 |
| 4,107,414 | 8/1978 | Gannini et al. | 526/114 |
| 4,107,415 | 8/1978 | Gannini et al. | 526/114 |
| 4,128,606 | 12/1978 | Furutachi et al. | 526/125 |
| 4,128,607 | 12/1978 | Shionura et al. | 260/878 B |
| 4,190,614 | 2/1980 | Ito et al. | 525/106 |
| 4,220,579 | 9/1980 | Rinehart | 260/33.6 AS |
| 4,284,738 | 8/1981 | Zukowski | 525/247 |
| 4,284,739 | 8/1981 | Zukowski | 525/268 |
| 4,297,445 | 10/1981 | Short et al. | 525/323 |
| 4,298,713 | 11/1981 | Morita et al. | 525/247 |
| 4,298,721 | 11/1981 | Borghi et al. | 526/348 |
| 4,308,357 | 12/1981 | Kaus et al. | 525/247 |

FOREIGN PATENT DOCUMENTS

| | | |
|---|---|---|
| 12397 | 6/1980 | European Pat. Off. . |
| 958079 | 5/1964 | United Kingdom . |
| 1134660 | 11/1968 | United Kingdom . |
| 1387890 | 3/1975 | United Kingdom . |
| 1435768 | 5/1976 | United Kingdom . |
| 1492864 | 11/1977 | United Kingdom . |

Primary Examiner—Paul R. Michl
Attorney, Agent, or Firm—Marvin Bressler; John A. Shedden

[57] ABSTRACT

Thermoplastic elastomeric sequentially prepared propylene and (ethylene-propylene) polymer, or propylene, (ethylene-propylene) and propylene polymer, made in solvent medium with catalyst system based on (a) complex of titanium tetrachloride and alkyl benzoate or a phenol, supported on magnesium dihalide and (b) trialkyl aluminum modified by electron rich substituted benzoate.

14 Claims, No Drawings

SEQUENTIALLY PREPARED THERMOPLASTIC ELASTOMER AND METHOD OF PREPARING SAME

This is a continuation in part of U.S. patent application, Ser. No. 263,236, filed May 13, 1981, now abandoned.

This invention relates to a thermoplastic elastomer and a method of making same.

More particularly the invention relates to a thermoplastic elastomer which is a sequentially prepared propylene and (ethylenepropylene) polymer, or a sequentially prepared propylene, (ethylene-propylene) and propylene polymer. In one aspect, the invention is directed to such a thermoplastic elastomeric sequentially prepared polymer having (A) crystalline polypropylene segments of isotactic polypropylene, and (B) amorphous segments of elastomeric ethylene-propylene, said segments (A) and (B) being partially block copolymerized to each other, the weight ratio of (A) to (B) segments being within the range of from 10:90 to 75:25 and the product being characterized by lamellar chain-folded crystallinity at room temperature, as evidenced by at least one differential thermal analysis ("DTA") melting point of at least 150° C. The product is believed to comprise two interpenetrating networks (two intertwined continuous phases) one of which is plastic in nature (essentially polypropylene) and the other rubbery in nature (essentially ethylene-propylene polymer).

It is known that in order to introduce true rubber characteristics (elasticity) to an amorphous polymeric material which is above its second order transition temperature (glass transition temperature, "Tg") at room temperature, one has to introduce "anchoring points" which tie the polymeric chains into giant macromolecules. When this is done by forming chemical bonds which link all the chains together, one talks about "curing" or "crosslinking" the rubber. However, chemically crosslinking the rubber alters the rubber to a point where it can no longer be reprocessed (it is no longer thermoplastic) and any scrap material has to be discarded. By using physical "crosslinks" (such as anchoring points based on high glass transition temperature, crystallinity, or ionic bonds) in place of true chemical crosslinks, one can undo the crosslinking effect by simply raising the temperature to a point which overcomes the anchoring of chains and allows random motion. Cooling reanchors the chains. Any scrap can thus be reused. These types of rubbers are called thermoplastic elastomers.

One known kind of thermoplastic elastomer is a blend of polyolefin plastic (e.g. polypropylene) and olefin copolymer rubber (e.g., EPM; ethylene-propylene rubber), known as "TPO". The thermoplastic elastomeric properties of TPO's are thought to come about from interpenetrating networks of a continuous plastic (polypropylene) phase and a continuous rubber (EPM) phase. The "crosslinking" in such polymers may be regarded as provided by "hard segments" interweaving through a continuous matrix of "soft material". There is thought to be enough interaction (Van der Waals forces) along the continuous interfaces to allow the hard segments to act as anchoring points at moderate temperatures and thus provide elastic behavior. At high temperatures (125° C.) the interactions are weakened and the stress-strain properties deteriorate rapidly. At even higher processing temperatures (160° C.) the anchoring points melt and thereby lose their rigidity, i.e., the material becomes thermoplastic. This allows the shaping of the blends into final form.

The TPO's exhibit electron micrographs at 8,000 to 20,000 magnification level consistent with interpenetrating networks;—domains of plastic particles in a "sea" of rubber for high rubber-low plastic content materials, to the other end of the spectrum of rubber domains in a "sea" of plastic for the low rubber-high plastic content materials. It has been shown by scanning electron microscopy of a hexane-extracted film of TPO that the undissolved polypropylene was present in a continuous network throughout the film. Following the holes created in the material as shown by the scanning electron micrograph, one can see that the EPM rubber phase was also continuous. The polypropylene phase has been shown to be isotactic polypropylene with a melting point in the range of 160°–175° C. The crystallites are of the chain-folded lamellae type.

Certain TPO's have some chemical crosslinking, introduced by partially curing with a peroxide or other curative while dynamically working the mixture, to enhance the properties without destroying thermoplasticity. The advantages of this are lower compression set, higher tensile at high temperatures, and better tensile to hardness ratio. The transmission electron micrographs of these dynamically partially crosslinked TPO's are different in that the two phases are better dispersed in one another and there are no smooth interfaces but rather many jagged edges delineate the boundary areas.

One object of the invention is to avoid the expensive and energy intensive mixing step necessary in preparing conventional blended types of TPO's. Another object is to provide a thermoplastic elastomer having good properties without any necessity for a dynamic partial curing step.

U.S. Pat. Nos. 3,378,606 and 3,853,969 issued to Emmanuel G. Kontos on Apr. 16, 1968 and Dec. 10, 1974, respectively, disclose semicrystalline or crystallizable block copolymers. The materials of Kontos are true (substantially complete) block copolymers as evidenced by the fact that the materials are soluble in boiling heptane, whereas the present products contain considerable (e.g. 30–70% by weight) heptane insoluble material. It is believed that properties of the Kontos products do not arise from interpenetrating networks but rather from domains in a sea of rubber. The rigid domains appear to act as anchor points for the rubbery chain segments; the rubbery chains are apparently chemically bonded to the rigid domains. Production of the Kontos materials is difficult because of low polymer yields, high solution viscosities and relatively long reaction times. Kontos employs a "living" catalyst, with the result that added monomer units continually add on to living ends of the polymer molecule existing in the reaction mixture, thus making a very high molecular weight polymer and producing a highly viscous reaction mass. The present process, in contrast, provides for formation of at least some of a short-lived polypropylene species which do not have a "living" end and therefore do not continue to grow by attachment to monomer added during the process. This provides the important crystalline polypropylene phase that is characteristic of the present product.

Similarly, U.S. Pat. No. 3,970,719, Edmonds, Jr., July 20, 1976, discloses a sequential polymer of polypropylene and (ethylene-propylene) made with living catalyst and containing no substantial separate polypropylene resin phase as in the present product.

The preparation of thermoplastic elastomers by direct polymerization of ethylene and propylene is disclosed in U.S. Pat. No. 4,298,721, Borghi et al, Nov. 3, 1981. The products unfortunately contain polypropylene crystallites having a DTA melting point of only 100° to 130° C.; molding shrinkage is high. The indications are that the product has a kind of crystallinity known as fringed micellar type, rather than the chain folded lamellar type characteristic of the product of the present invention. The present products maintain good properties at elevated temperatures whereas the lower melting points of the Borghi et al products limits their usefulness to temperatures below 80° C.

U.S. Pat. No. 4,107,414, Giannini et al., Aug. 15, 1978, discloses making prevailingly isotactic polymers (i.e. crystalline materials with little or nor amorphous component) from propylene and higher alpha-olefins, using a catalyst which is useful in the present invention. Also disclosed is the polymerization of propylene in the presence of small amounts of ethylene fed continuously or intermittently after a conversion of propylene into polypropylene of at least 80% is reached. In the present elastomeric products, in contrast, not more than 70% (typically much less) of total polymerized propylene is represented by the crystalline segment.

In accordance with the present invention, reactor-produced thermoplastic polyolefins are prepared by sequential polymerization of propylene and (ethylene-propylene) or propylene, (ethylene-propylene), and propylene using supported complexed titanium catalysts with modified organo aluminum cocatalysts. In general the catalyst system employed may be characterized as a catalyst based on titanium halide (or complex thereof with an electron donor) supported on a carrier such as a magnesium or manganese halide, and a cocatalyst which is an organo aluminum compound such as an alkyl aluminum, particularly a substitution or addition product of a trialkyl aluminum with an electron donor. The polymers produced are characterized by a total propylene content of from 60 to 95% by weight; a ratio of adsorption intensity, in the infrared spectra, between the band at 11.88 microns and the band at 12.18 microns of more than 7.0; in the Raman spectra, a ratio of the intensity of the band at 810 cm$^{-1}$ and the band at 840 cm$^{-1}$ of more than 1.0 and a ratio of the intensity of the band at 2880 cm$^{-1}$ to the band at 2850 cm$^{-1}$ of more than 2.0; at least one differential thermal analysis melting point of at least 150° C.; a flexural modulus, at room temperature, of less than 100,000 psi; an elongation, at room temperature, of more than 150%.

The polymers produced are further characterized by melting points of 150° to 156° C. for some of the segments; useful rubbery properties somewhat below these melting points and down to at least −30° C.; and processability in equipment used for thermoplastic materials above the melting points referred to above.

We have now found, in accordance with the invention, that carrying out the polymerization in stages so as to polymerize only propylene in the first phase and ethylene and propylene in the second stage leads to materials with high melting points (150°–166° C. determined by DTA; see B. Ke, "Newer Methods of Polymer Characterization," 1964, Interscience Publishers, chapter 14) and god tensiles for a given hardness value (Shore A). The present new polymers tend to retain some of their useful properties even at the high temperatures of 250° F. (120° C.).

A tri-step polymerization where propylene is polymerized in the first step and ethylene and propylene in the second step followed by propylene polymerization in the third step, gives rise to similar polymers with possibly slightly lower Tg values and higher tensile values.

It is believed that in the process of the invention propylene is initially polymerized to yield at least two different polypropylene species, one species being a living polypropylene polymer capable of continuing addition of other monomer units to its living end, while an other species has a relatively shorter lived end that dies off leaving polypropylene that will not grow more. Therefore at the end of the first polymerization sequence the reaction mixture is thought to contain non-living polypropylene (resin) and living polypropylene. When ethylene is added in the next polymerization sequence, it is believed that the polymerization can take several routes, including addition of ethylene and propylene onto the living polypropylene from the first step. It is thought that at the end of the second sequence the species present can include PP, EP, P-EP, living EP and living P-EP. At this stage the polymerization can be ended, or the process can proceed to a third sequence involving addition of more propylene monomer. After addition of further propylene, the polymerization can continue with more variations. Thus, the living EP and living P-EP can add on propylene and more polypropylene can be formed. It is thought possible that the final mixture, after quenching the living polymer, can include such species as PP, EP, P-EP, EP-P, and P-EP-P. While it is not desired to limit the invention to any particular theory of operation, it is believed to be possible that the unique nature of the present product is a consequence of the ability of the catalyst system employed to form not only polypropylene with living ends having a relatively long life as in such prior art as Kontos, but also polypropylene with short lived ends with the result that a resinous polypropylene phase is formed in addition to the rubber phase. In the present product, from 10 to 70% of the total polymerized propylene is in a crystalline, isotactic (resinous) form.

It is not immediately evident that the present "P/EP" and "P/EP/P" type polymers would be so useful. Many polypropylene catalyst systems will incorporate ethylene to some extent so that the preparation of some kind of P/EP/P and P/EP type polymer is made possible. What is especially novel is that P/EP and P/EP/P polymers of the invention have such good physical properties without undergoing an intensive mixing step, and without dynamic partial curing. In nearly all other cases, polymers produced with the other propylene catalyst systems have very poor physical properties.

In these latter cases, there is apparently not enough interfacial interaction between phases or enough dispersion of the two phases (or a combination of both) to give the required stress-strain properties. An example of such a catalyst system is the well known alkyl aluminum halide—TiCl$_3$AA catalyst system.

Conversely in the present case where one uses a supported-complexed titanium catalyst one surprisingly gets enough dispersion of the polypropylene to give the desired stress-strain properties.

The present P/EP/P polymerization is a method of making product in which monomers are introduced to maximize the polymerization to P/EP/P. The product is not exclusively a true tri-block polymer. In reality, as indicated, all the possible combinations such as polypropylene, propylene-EP block, EP-propylene block, ethylene-propylene copolymer, and propylene, ethylene-propylene, propylene tri-block polymer are apparently present. A similar situation appears to exist with the P/EP polymer. In any event, the catalyst species present, the polymerization rates, the sequential polymerization, and the workup, all combine to give mixtures which possess the properties needed to be of commercial interest.

The thermoplastic elastomers of the present invention contain from 60 to 95% by weight of propylene and show crystallinity of the isotactic propylene type. The crystallinity values are in the range of 15 to 45% as measured by X-ray. The polypropylene segments comprise 15–70% by weight of the total polymerized propylene. The intrinsic viscosity of the polymers (measured in tetralin at 135° C.) is between 1.5 and 6 or even higher and the tensile values are dependent not only on propylene content but also on the molecular weight as reflected in the intrinsic viscosity value. The flexural modulus and elongation, at room temperature are less than 100,000 pounds per square inch and more than 150%, respectively.

Uniquely, the thermoplastic elastomers of this invention are characterized by spectral properties that include, in the infrared spectrum, a ratio of absorption intensity between the band at 11.88 microns to the band at 12.18 microns of more than 7.0; in the Raman spectrum, a ratio of the intensity of the band at 810 cm$^{-1}$ to the band at 840 cm$^{-1}$ of more than 1.0, and a ratio of the intensity of the band at 2880 cm$^{-1}$ to the band at 2850 cm$^{-1}$ of more than 2.0.

In the first step or stage of the present process in which the initial polypropylene sequence is formed, the amount of propylene polymerized is only 70% by weight or less of the polypropylene charged, leaving 30% or more available for the second (EP) or third (EP/P) steps. Typically the amount of propylene polymerized in the first step represents less than 50%, frequently not more than 30%, of the polypropylene charged in the first step.

The thermoplastic elastomers of the invention are prepared by sequential polymerization using a catalyst system of the kind described in U.S. Pat. No. 4,298,721, Borghi et al., Nov. 3, 1981, U.S. Pat. No. 4,107,414, Giannini et al. Aug. 15, 1978 or European Patent Application No. 0 012 397, Phillips Petroleum Co., June 25, 1980, the disclosures of which are hereby incorporated herein by reference. As described in U.S. Pat. No. 4,298,721, suitable catalyst comprises the product obtained by reacting an addition compound of a halogen-containing compound of di-, tri- or tetra-valent titanium and an electron-donor compound, the addition compound being supported on a carrier comprising an activated anhydrous magnesium dihalide and having in the supported state in its X-ray powder spectrum a halo in the place of the most intense diffraction line of the X-ray powder spectrum of the corresponding non-activated halide, with an addition and/or substitution product of an electron-donor compound (or Lewis base) with an aluminium trialkyl, or an addition product of an electron-donor compound with an aluminum-alkyl compound containing two or more aluminium atoms bound to each other through an oxygen or nitrogen atom, prepared by reacting 1 mole of an aluminium alkyl compound with from 0.1 to 1 mole of an ester of an organic or inorganic oxygen-containing acid as the Lewis base, a di- or a poly-amine, or another Lewis base if the titanium compound contained a di- or poly-amine as electron-donor compound, the titanium compound content being less than 0.3 g of titanium per mole of the total amount of electron-donor compound in the catalyst, and the molar ratio of the halogen-containing titanium compound to the aluminium alkyl compound being from 0.001 to 0.1.

As described in U.S. Pat. No. 4,107,414, the catalyst is comprised of the following components:

(a) an addition and/or substitution reaction product of an electron-donor compound (or Lewis base) selected from the group consisting of an ester of an oxygenated organic or inorganic acid with an Al-trialkyl compound or with an Al-alkyl compound containing two or more Al atoms linked together through an oxygen or a nitrogen atom, the amount of Al-alkyl compound contained in a combined form with the ester in catalyst-forming component (a) being from 0.05 to 1.0 mole per mole of the starting Al-compound; and (b) the product obtained by contacting a Ti compound selected from the group consisting of halogenated bi-, tri-, and tetravalent Ti compounds and complexes of said Ti compounds with an electron-donor compound, with a support which comprises, as the essential support material thereof, an anhydrous bihalide of Mg or Mn in an active state such that the X-rays powder spectrum of component (b) does not show the most intense diffraction lines as they appear in the X-rays powder spectrum of normal, nonactivated Mg or Mn bihalide, the X-rays powder spectrum of component (b) showing a broadening of said most intense diffraction lines, and component (b) being further characterized in that the amount of Ti compound present therein, expressed as Ti metal, is less than 0.3 g-atom per mole of the total amount of the electron-donor compound present in a combined form in the catalyst and the catalyst being additionally characterized in that the Al/Ti molar ratio is from 10 to 1,000.

Also suitable is the catalyst of European Patent Application No. 0,012,397 which may be described as formed on mixing:

(A) a catalyst component (A) formed by milling
   (1) a magnesium halide or manganous halide with
   (2) at least one catalyst adjuvant selected from
      (a) hydrocarbyl metal oxides of the formula M(OR)$_n$ wherein M is aluminium, boron, magnesium, titanium or zirconium, n is an integer representing the valence of M and ranges from 2–4, and R is a hydrocarbyl group having from 1 to 24 carbon atoms per molecule,
      (b) organo phosphite of the formula

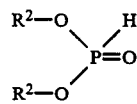

wherein R$^2$ is an aryl, aralkyl, alkaryl or haloaryl group having from 6 to 20 carbon atoms,
      (c) aromatic phenols of the formula HOR$^1$ wherein R$^1$ is an aryl group containing from 6 to about 20 carbon atoms,
      (d) aromatic ketones of the formula

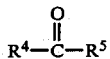

wherein $R^4$ is a thiophene, aryl or alkyl group and $R^5$ is an aryl group containing 6 to 20 carbon atoms, (e) organo silanols of the formula

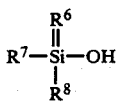

wherein $R^6$, $R^7$ and $R^8$ are the same or different and are hydrocarbyl groups containing from 4 to 20 carbon atoms, (f) organo phosphates and phospines of the formula

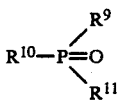

wherein each R in the same or different hydrocarbyl or hydrocarbyloxy group containing from 1 to 20 carbon atoms, (g) aromatic amines of the formula $R^5NHR^{12}$ wherein $R^5$ is an aryl group having from 6 to 20 carbon atoms and $R^{12}$ is hydrogen or an aryl group having from 6 to 20 carbon atoms, (h) oxygenated terpenes selected from among carvone, dihydrocarvone, carvenone and carvomenthane, (i) triarylphosphites having from 6 to 24 carbon atoms in each aryl group, and (j) halogen-containing organo phosphorous compounds of the formulae $PX_{3-a}(OR^3)_a$,

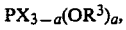

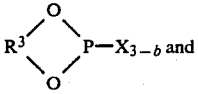

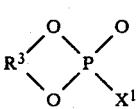

where $R^3$ is an aryl group containing from 6 to 20 carbon atoms, X is a halogen, a is 1 or 2 and b is zero or 2, to form a milled composite wherein the molar ratio of (1) to (2) ranges from 4:1 to 100:1;

(3) treating the composits obtained from (1) and (2) with a tetravalent titanium halide for a period of time sufficient to incorporate titanium tetrahalide in at least a portion of the surface of said milled component; and (B) a cocatalyst component comprising at least one of an organoaluminum compound and an organoaluminum monohalide wherein the molar ratio of component (B) to titanium compound ranges from 0.5:1 to 2000:1 and the amount of titanium percent in the finished catalyst ranges from about 0.1 to about 10 weight percent based on the dry composits.

In a preferred process for preparing thermoplastic elactomers by sequential polymerization in accordance with the invention there is employed a catalyst system (hereinafter referred to as Preferred Catalyst System I) made by reacting:

(a) a catalyst which is an addition compound of titanium tetrachloride with an alkyl benzoate (methyl benzoate, or, more preferably higher alkyl benzoates), supported on an anhydrous magnesium dihalide and ground to give particles below 1 micron in size; with (b) a cocatalyst which is a trialkyl aluminum modified by reaction with alkyl p-substituted benzoates having Hammett sigma values which are zero or negative (electron-rich substituents). Two preferred examples are ethyl anisate and ethyl p-t-butyl benzoate. The molar ratio of titanium tetrachloride to alkyl benzoate in (a) is 1.1 to 1. The weight ratio of magnesium dihalide to the complexed titanium compound is 4 to 1 or higher. The molar ratio of trialkyl aluminum to benzoate ester in (b) is from 2 to 1 to 10 to 1. The molar ratio of aluminun to titanium is at least 50 to 1, e.g. from 50 to 1 to 200 to 1 or even higher.

In another preferred practice of the sequential polymerization method of the invention there is employed a catalyst system (hereinafter referred to as Preferred Catalyst Systems II) which may be described as a $TiCl_4$ supported on $MgCl_2$ and modified by an aromatic hydroxy compound. The phenol can be phenol itself, alphanaphthol, beta-naphthol, p-chlorophenol, p-methylphenol (p-cresol) and the other cresols, etc. The catalyst is prepared by grinding the $MgCl_2$ and phenol in a vibratory ball mill or similar apparatus for from 16 to 72 hours, then treating this mixture with excess $TiCl_4$ in a solvent at elevated temperatures. Decantation of the solvent followed by two washings with fresh solvent and drying of the precipitate (all under $N_2$) gave the desired catalyst. The weight ratio of $MgCl_2$ to phenol is 4/1 to 100/1. The mole ratio of $MgCl_2$ to $TiCl_4$ is 2000/1 to 14/1.

The cocatalyst system is the same as described above in connection with Preferred Catalyst System I, except for the fact that the cocatalyst and modifier do not have to be pre aged. In fact aging for 30 minutes appears to reduce catalytic activity. The cocatalyst system contains an aluminum alkyl modified by an alkyl p-substitutedbenzoate. The para substituent is hydrogen or an electron donating group. (Hammet sigma value is either zero or negative). The ratio of Al to modifier is 2/1 to infinity.

It will be noted that Preferred Catalyst System II is essentially the same as Preferred Catalyst System I except that in Preferred Catalyst System II a phenol is substituted for the alkyl benzoate in (a) of Preferred Catalyst System I.

The polymerization is typically conducted at a temperature of from 20° to 80° C. or even higher, for the propylene step and from −10° to 80° C. for the ethylene-propylene step. The preferred procedure is to heat the polymerization system to 55° C. and begin the polymerization keeping the temperature below 77° C. The second step, the copolymerization of ethylene and propylene, is usually carried out between 60° and 77° C. and the third step, if present, is usually kept between 60° and 77° C.

The first polymerization step can require as little as 10 to 25 minutes, the second step as little as 15 to 45 minutes, and the last step, if present, as little as from 10 to 25 minutes. Of course, longer times are also possible. The precise reaction time will depend on such variables as the reaction temperature and pressure, the heat transfer rate, etc.

The polymerization is preferably carried out in organic solvent such as a hydrocarbon fraction (boiling, for example, between 30° and 60° C.), such as hexane. Other solvents such as heptane, octane, or higher alkanes can be used. Aromatic hydrocarbons can also be used, benzene and toluene being two examples. The polymers produced are only partially soluble in the solvent, thus giving one a slurry type polymerization. The solvent is "inert" in the sense that it does not adversely interfere with the catalyst or the polymerization reaction. An excess of propylene over and above the propylene which takes part in the polymerization, can serve as the reaction medium; isobutylene is another example of a suitable reaction medium.

The fact that the polymers are not completely soluble in the solvent system allows one to run at high solids concentration since the viscosity of the reaction medium is low for a given solids content thus helping to facilitate heat transfer to keep the exothermic polymerization under control. The polymerization gives rise to a small particle type slurry (easily dispersed) so that handling problems are facilitated and transfer of the reaction mixture from the reactor to finishing equipment is easily accomplished.

The work-up of the polymer involves addition of a short-stop; addition of antioxidants, steam-floccing, or vacuum drum drying, as in conventional practice. The efficiencies of polymerization (20,000 to 100,000 g polymer/g of titanium) make a washing step unnecessary unless it is desired to minimize aluminum residues. If necessary, a washing step can be instituted. The crumb obtained can be dried and diced for use in injection molding or prepared in other forms such as flakes by using conventional commercial equipment. Oil extension will give rise to soft polymers with excellent tensile to hardness ratios.

The examples below illustrate the preparation of the catalyst and the practice of the invention.

PREPARATION OF PREFERRED CATALYST SYSTEM I

(A) Preparation of Ti Complex

An apparatus consisting of a one liter 3-necked flask, a mechanical stirrer, an addition funnel, a thermometer, and a reflux condenser which had been oven dried at 110° C. was equipped with an adapter at the top of the condenser to keep the apparatus under a $N_2$ stream. The $N_2$ exited through a bubbler containing a small amount of oil. Heptane (450 ml) and $TiCl_4$ (48 ml, 82.8 g, 0.436 moles) were added under $N_2$ and after heating to 65° C., the dropwise addition of a solution of 52 ml (54.7 g, 0.364 moles) of ethylbenzoate in 50 ml of heptane was begun. After the addition was complete, the reaction mixture was stirred for 1 hour. The heptane was stripped off under vacuum and the solid complex which fumes in air was put in a taped bottle in the $N_2$ glove box. The complex appears to be active indefinitely in the absence of air.

(B) Formation of Supported Catalyst Complex

An oven dried polypropylene wide mouthed bottle containing ceramic balls was half-filled with a mixture of 4 parts of anhydrous $MgCl_2$ for every 1 part of catalyst complex under $N_2$. The selflocking cover was taped to further protect the contents and the bottle put in a vibrating ball mill for at least 15 hours and usually 30 hours. The supported complex was separated from the ceramic balls in a glove box and stored until needed. The dry complex appears to be stable at least for 3–5 months. When it is dispersed in solvent it begins to lose activity after about 4 days. One gram of the complex contains 28 mg of titanium.

(C) Formation of Cocatalyst Complex

The 25% $Et_3Al$ (1.6M) was reacted in hexane or heptane with the required amount of ethyl anisate (10–40 mole %), keeping the temperature below 50° C. The clear yellow solution was aged for ½ hour before adding to the polymerizing medium. The same was done for ethyl p-t-butyl benzoate when used in place of ethyl anisate. The use of other modifiers gave much poorer results. Leaving out the modifiers gave rise to high yields of low molecular weight polymers with lower tensile values.

EXAMPLES 1–7 AND COMPARISON EXAMPLE 1

In a 20 gallon jacketed pressure reactor equipped with a sealed mechanical stirrer were added 40 Kg of hexane followed by 4 Kg of propylene. The contents were heated to 130° F. Aged cocatalyst was then added consisting of 250 ml of 1.6M. $Et_3Al$ (400 millimoles) diluted with 400 ml of hexane and reacted with 16.7 g ethyl p-t-butyl benzoate (EPTBB) (equivalent to 86.4 millimoles of ester) to give a mole ratio of 0.216 of ester ot $AlEt_3$. The solution of cocatalyst had been aged ½ hour before addition to reactor.

Addition of 6.4 g (180 mg Ti) of supported catalyst dispersed in hexane initiated the reaction and propylene was fed in to maintain the pressure at 50 psig. A regulator valve was used to control the pressure. The temperature rose from 130° F. to 142° F. even with cooling on. After 15 minutes the propylene feed was turned off and CP ethylene fed rapidly till 400 g of ethylene had been introduced. The pressure at this point was 55.2 psig. Ethylene and propylene at a 1 to 1 molar ratio were fed in to maintain this pressure. With the introduction of E/P, the temperature climbed to 175° F. even with full cooling. After 45 minutes the temperature was 148° F. The monomer feeds were turned off and the reaction mixture was dumped, the reactor was rinsed with hexane, the rinse was added to the dump and the total short-stopped with 100 g isopropyl alcohol. At this point 40 g of antioxidant was added with mechanical stirring and the polymer suspension was steam-flocced to recover the crumb. Drying and massing on a mill to give homogeneous product gave a yield of 7730 g (efficiency=42,944 g polymer per gram of titanium).

The pertinent data for this example are in Table I under Example 1. It is seen that one had 90% utilization of the total ethylene added and 75% utilization of the total propylene added.

The polymer has 45% propylene crystallinity as measured by X-ray with 15% ethylene content. The Tg is −48° C. and the melting point by DTA of the polymer is 154° C., indicating the presence of isotactic propylene segments. The injection molded sample has a tensile of 1736 psi at 520% elongation. The 250° F. properties are adequate especially when compared to the U.S. Pat. No. 4,298,721 one-step product with no high temperature tensile and a melting point of 248° F. (120° C.).

Examples 2–7 which were run under essentially identical conditions are recorded in Table 1.

Example C-1, which is a comparison or control example outside the scope of the invention, is included to show the difference between polymer made in accordance with the one-stage process of U.S. Pat. No. 4,298,721 and the thermoplastic elastomer of this invention. It is evident that at 250° F. the tensile of the Example C-1 polymer for all practical purposes is zero.

The propylene was turned off and ethylene added to increase the pressure to 55.0 psig. The pressure was kept at this level by feeding in ethylene and the second phase run for 25 minutes. The temperature was 146° F. and the pressure 55.3 psig.

The final 25 minutes was run with only propylene monomer where the pressure dropped to 40 and the temperature to 110° F.

The polymer slurry was dumped, the reactor rinsed with hexane and added to the dump. The polymerization was shortstopped with isopropanol (100 g.) and antioxidant added with stirring.

The polymer was recovered by steam floccing, drying under vacuum and massing on a mill to assure a

TABLE I

| | REACTOR TPO'S: PILOT PLANT RUNS OF P/EP TYPES IN 20 GALLON REACTOR | | | | | | | |
|---|---|---|---|---|---|---|---|---|
| EXAMPLE # | 1 | 2 | 3 | 4 | 5 | 6 | 7* | C-1 |
| TYPE | P/EP | P/EP | P/EP | P/EP | P/EP | P/EP | P/EP | EP |
| COCATALYST | Et$_3$Al/EpTBB | Et$_3$Al/EpTBB | Et$_3$Al/EA | Et$_3$Al/EA | Et$_3$Al/EpTBB | Et$_3$Al/EpTBB | Et$_3$Al/EA | Et$_3$Al/EA |
| m mole/m mole | 400/86 | 400/86 | 400/73 | 400/73 | 400/86 | 400/73 | 1200/325 | 400/146 |
| CATALYST (mgTi) | 180 | 180 | 180 | 135 | 135 | 135 | 450 | 180 |
| TIME (MIN.) | 15/45 | 15/45 | 15/45 | 15/45 | 15/45 | 15/45 | 20/40 | 60 |
| YIELD (g.) | 7730 | 8893 | 9100 | 11,500 | 8120 | 8000 | 8,245 | 4906 |
| EFFICIENCY | 42,944 | 49,405 | 60,555 | 85,185 | 60,148 | 59,259 | 18,322 | 27,256 |
| ML-4 @ 257 | 48–38 | 40–38 | 39 | 15 | 65–35 | 66–25 | — | 82–50 |
| BROOKFIELD CP | 465 | 400 | 350 | 600 | 1250 | 2000 | 62 | 310 |
| % ETHYLENE | 15 | 18 | 22 | 23 | 24 | 28 | 20 | 30.7 |
| [n]$^{135}$ | 2.63 | 1.63 | 1.55 | 1.58 | 2.18 | 2.79 | 1.94 | 2.44 |
| % CRYST. (X-RAY) | 45 | 22 | 36.5 | 20.9 | 28.8 | 27.6 | 29.8 | 30.9 |
| Tg (C.°) | −48 | −50 | −56 | −66 | −56 | −57 | −59 | −46 |
| Tm (C.°) | 154 | 154 | 166 | 156 | 161 | 156 | 155 | 120 |
| % UTIL. OF E. | 90 | 100 | 95 | 95 | 97 | 100 | 97 | 100 |
| % UTIL. OF P. | 75 | 92 | 90 | 98 | 83 | 92 | 45 | 63 |
| INJECTION MOLD | | | | | | | | |
| R.T. SHORE A | 89 | 92 | 88 | 72 | 84 | 82 | 88 | 86 |
| 100% MOD (PSI) | 1271 | 979 | 723 | 486 | 616 | 625 | 1507 | 760 |
| TENSILE (PSI) | 1736 | 1518 | 1144 | 832 | 1076 | 976 | 2078 | 1291 |
| FLEX. MOD (PSI)** | 16,300 | 16,400 | 15,100 | 5300 | 6500 | 24,600 | — | 6500 |
| % ELONG. | 520 | 723 | 727 | 750 | 623 | 517 | 700 | 620 |
| TEAR pli | 531 | 411 | 339 | 237 | 298 | 266 | 592 | 359 |
| 250° F. | | | | | | | | |
| 100% MOD (PSI) | 98 | 80 | 70 | 37 | 49 | 48 | 216 | 20 |
| TENSILE (PSI) | 323 | 249 | 154 | 133 | 158 | 146 | 550 | 36 |
| ELONG % (PSI) | 950 | NB | NB | NB | 1193 | 1010 | 1100 | 1183 |

*The polymer was extracted with boiling hexane, % soluble was 39.8%
**As determined by ASTM D-790-71, Method B

EXAMPLES 8–13

In a 20 gallon reactor as in Example 1 were added 40 Kg of hexane and 4000 g of propylene. The solution was then heated to 132° F. A prereacted soution of 400 millimoles of Et$_3$Al and 146 millimoles of ethyl anisate in hexane was added to the reactor after aging ½ hour and the polymerization initiated by adding the Ti$^{4+}$ catalyst (180 mg. titanium). The pressure was 46.5 psig at this point and propylene monomer was fed as needed to keep pressure at this point. The reaction exothermed to 142° F. after ten minutes and after 25 minutes the pressure was at 47 psig and the temperature was 126° F.

homogeneous mix. The yield was 4,500 g. (24,772 g/of polymer per g of titanium).

The physical properties are in Table II under Example 8. It is seen that the properties like tensile are very good. The high temperature tensile is also very good. Monomer utilization is good for ethylene and fair for the propylene.

Examples 9–13 in Table II are more or less run in a similar manner to give the properties described in Table II. Again, the high temperature properties are excellent for materials of high hardness and become poorer as the hardness decreases as expected.

TABLE II

| | REACTOR TPO'S; PILOT PLANT RUNS OF P/EP/P TYPES IN 20 GALLON REACTOR | | | | | |
|---|---|---|---|---|---|---|
| EXAMPLE # | 8 | 9 | 10 | 11 | 12 | 13 |
| TYPE | P/EP/P | P/EP/P | P/EP/P | P/EP/P | P/EP/P | P/EP/P |
| COCATALYST | Et$_3$Al/EA | Et$_3$Al/EA | Et$_3$Al/EA | Et$_3$Al/EA | Et$_3$Al/EpTBB | Et$_3$Al/EA |
| MMoles/MMoles | 400/140 | 400/140 | 400/140 | 400/140 | 400/85 | 400/140 |
| CATALYST (mg of Ti) | 180 | 180 | 180 | 180 | 180 | 180 |
| TIME (MIN.) | 25/25/25 | | | | | |
| H$_2$ PSI | 0 | 0 | 2.5 | 7.5 | 2.5 | 2.5 |
| YIELD (g.) | 4500 | 4630 | 5440 | 4880 | 8940 | 4200 |
| EFFICIENCY | 24,772 | 25,700 | 30,239 | 27,128 | 49,667 | 23,556 |

TABLE II-continued

REACTOR TPO'S; PILOT PLANT RUNS OF P/EP/P TYPES IN 20 GALLON REACTOR

| EXAMPLE # | 8 | 9 | 10 | 11 | 12 | 13 |
|---|---|---|---|---|---|---|
| ML-4 @ 257 | 139 | 130 | 95 | 58 | 34 | 70-95 |
| BROOKFIELD CP | — | — | — | 105 | 875 | 600 |
| % ETHYLENE | 8.7 | 22.4 | 21.2 | 32.1 | 33 | 35.7 |
| $[\eta]^{135}$ | 3.67 | 4.85 | 2.0 | 1.82 | 1.67 | 2.17 |
| % CRYST. (X-RAY) | 39 | 37 | 37.1 | 22.7 | 27.3 | 38.7 |
| Tg | | −45 | −55 | −46 | −60 | −53 |
| Tm | 154 | 156 | 162 | 159 | 162 | 160 |
| % UTIL. OF E. | 97 | 100 | 100 | 97 | 100 | 91 |
| % UTIL. OF P. | 49 | 45 | 52 | 40 | 76 | 33 |
| INJECTION MOLD R.T. SHORE A | 95 | 93 | 89 | 89 | 75 | 91 |
| 100% MOD PSI | 2216 | 1631 | 1187 | 774 | 491 | 820 |
| TENSILE PSI | 2578 | 2121 | 1756 | 1343 | 927 | 1375 |
| % ELONG. | 537 | 390 | 653 | 823 | 787 | 677 |
| FLEX. MOD PSI* | 69,600 | 22,500 | 14,800 | 16,000 | 4500 | 12,300 |
| TEAR PLI | 700 | 632 | 370 | 352 | 210 | 377 |
| 250° F. | | | | | | |
| 100% MOD PSI | 277 | 253 | 102 | 77 | 31 | 113 |
| TENSILE PSI | 956 | 430 | 262 | 144 | 61 | 233 |
| ELONG % | 900 | 650 | NB | NB | 960 | NB |

*As determined by ASTM D-790-71, Method B.

EXAMPLES 14-20

Example 15 are recorded in Table III along with similarly carried out Examples 16-21.

TABLE III

OIL EXTENDED TPO POLYMERS

| EXAMPLE # | 14 | 15 | 16 | 17 | 18 | 19 | 20 |
|---|---|---|---|---|---|---|---|
| TYPE | P/EP/P | P/EP/P | P/EP/P | P/EP/P | P/EP | P/EP | P/EP |
| AMOUNT | 80.0 | 80 | 80 | 80 | 80 | 80 | 80 |
| TENSILE PSI | 927 | 1343 | 1375 | 1375 | 735 | 1623 | 1062 |
| OIL | TUFFLO 6056 | TUFFLO 6056 | TUFFLO 6056 | TUFFLO 6056 | TUFFLO 6056 | TUFFLO 6056 | TUFFLO 6056 |
| AMOUNT (pph) | 20.0 | 20.0 | 20.0 | 40.0 | 20 | 20 | 20 |
| INJECTION MOLD | | | | | | | |
| SHORE A | 66 | 77 | 82 | 66 | 54 | 78 | 68 |
| TENSILE PSI | 563 | 1784 | 1074 | 697 | 473 | 1234 | 751 |
| ELONGATION % | 773 | 810 | 737 | 720 | 797 | 337 | 430 |
| COMPRESSION SET | 53 | 53 | 53 | 51 | 37 | 37 | 41 |
| 100% ELONG. SET | 30 | 30 | 42 | 40 | 30 | 19 | 20 |
| 100% MOD | 296 | 941 | 582 | 353 | 209 | 804 | 453 |
| TENSILE/HARDNESS | 11.7 | 23.2 | 13.1 | 10.9 | 8.8 | 15.8 | 11.0 |

The oil extension of these thermoplastic elastomers gives materials which are softer, and yet maintain good tensile values. We are able to get Short A hardness values of below 70 and keep our tensile values above 600 psi. This is difficult to do with TPO's as a group. The oil used in these experiments is Tufflo (trademark) 6056 and is a paraffinic hydrocarbon oil from Atlantic Richfield. The oil is mixed on a mill or on a Banbury with the stabilizers and the resultant product injection molded. The properties of the oil extended material of

EXAMPLES 21-24 AND COMPARISON EXAMPLES 2-4

Thermoplastic elastomer samples, Examples 21-24, within the contemplation of this invention were analyzed to determine their spectral characteristics. The results of these tests are summarized below in Table IV. Included in the table are Comparison Examples C-2, C-3 and C-4 illustrative of ethylene-propylene polymers of the prior art.

TABLE IV

| EXAMPLE # | 22 | 23 | 24* | C-2** | C-3 | C-4 |
|---|---|---|---|---|---|---|
| TYPE | P/EP | P/EP | P/EP/P | EP | Block EP | P/EPDM |
| % ETHYLENE | 29.4 | 18.0 | 22.0 | 30.7 | 25.0 | 27.0 |
| $[\eta]^{135}$ | 2.29 | 1.73 | 4.85 | 2.43 | 2.87 | 1.26 |
| % CRYS (X-RAY) | 41.1 | | 37.0 | 30.9 | 49.0 | 31.0 |
| Tg (°C.) | −50 | −35 | −45 | −46 | NONE | −58 |
| $T_m$ (C.°) | 161 | 162 | 156 | 120 | 162 | 161 |
| 11.88/12.18 (IR RATIO) | 26.5 | 12.1 | 9.6 | 3.4 | 14.0 | 14.0 |
| 810/840 (RAMON RATIO) | 1.589 | 1.2168 | 1.486 | 0.923 | 1.5401 | 1.566 |
| 2880/2850 (RAMON RATIO) | 2.146 | 2.3510 | 2.351 | 2.039 | 2.235 | 1.854 |
| FLEXURAL MOD (PSI) | 25,000 | 18,200 | 22,000 | 6,500 | 112,800 | 24,000 |
| R.T. TENSILE STR (PSI) | 1,643 | 2,953 | 2,121 | 1,291 | 2,913 | 970 |
| ELONGATION (%) | 650 | 610 | 390 | 620 | 97 | 330 |

*Same Polymer as Example 9
**Same Polymer as Example C-1

The data in Table IV distinguishes the thermoplastic elastomers of the present invention from those of the prior art. As seen, the ratio of the absorption intensity in the IR spectrum between the band at 11.88 microns and the band at 12.18 microns, discussed in U.S. Pat. No. 4,298,721, and incorporated herein by reference, for polymers within the contemplation of this invention is more than 7.0. Similarly the ratio of the intensities of the band at 810 cm$^{-1}$ and the band at 840 cm$^{-1}$, in the Raman spectrum, for polymers within the contemplation of this invention, is more than 1.0, while the ratio of the intensity of the band at 2880 cm$^{-1}$ to the band at 2850 cm$^{-1}$ for the elastomers of this invention is more than 2.0. Thermoplastic elastomers of the one-step process, representative of the prior art, as disclosed by U.S. Pat. No. 4,298,721, and illustrated by Example C-2 in Table IV above, yield an equivalent IR ratio of less than 7.0 and a Raman spectra ratio of less than 1.0.

The one-stage polymers of U.S. Pat. No. 4,298,721 are furthermore distinguished by a differential thermal melting point of only 120° C., below the requirement of the thermoplastic elastomers of the present invention, which are characterized by at least one differential thermal melting point of at least 150° C.

Comparison example C-3 is illustrative of plastic block copolymers of the prior art. Although this sample is not distinguishable over the polymers of this invention by analysis of the spectral data, it is clearly distinguished by the absence of a glass transition temperature characteristic of crystalline plastics. Thermoplastic elastomers all possess a glass transition temperature.

Crystalline plastics, exemplified by Example C-3, are similarly distinguished by their high flexural modulus, typically above 100,000 psi, in this example 112,800 psi and low elongation, usually less than 150%, in this example 97%. These properties distinguish thermoplastic elastomers of this invention which typically have a flexural modulus of less and oftentimes considerably less, than 100,000 psi. Thermoplastic elastomers of this invention are similarly distinguished from block copolymer plastics by their high elongation, characteristics of rubbery polymers. Thermoplastic elastomers of this invention have elongations in excess of 150%.

Comparison Example C-4 is directed to a typical thermoplastic elastomer of the prior art. Often thermoplastic elastomers of the prior art are physical blends of a crystalline plastic, usually, as in Comparison Example 3, polypropylene, and an elastomer, usually, as in Comparison Example 3, EPDM. These polymers are distinguished from the thermoplastic elastomers of the present invention by their Raman spectrum characteristics. Specifically, the ratio of the intensity of the band at 2880 cm$^{-1}$ to the intensity of the band at 2850 cm$^{-1}$ in the Raman spectra of physically blended thermoplastic elastomers is less than 2.0. The same ratio for the thermoplastic elastomers of the present invention is more than 2.0.

EXAMPLE 26

Catalyst Preparation

This example utilizes Preferred Catalyst System II. Anhydrous MgCl$_2$ (45 g) is mixed with purified phenol (6.3 g) then ground for 31 hours. The material was sifted into a 500 ml 3 necked round bottom flask in an inert atmosphere and treated with 150 ml of heptane and 18 ml of TiCl$_4$. The mixture was heated at 100° C. for 1 hour, cooled, the liquid decanted, and the precipitate washed two time with fresh solvent. All the above operations were done under dry nitrogen. The precipitate was then heated to 50° C. and dried in a steam of nitrogen.

20 Gallon Reactor Run

To a clean, and dried reactor was added 40 Kg of hexane and 4 Kg of purified propylene. The solution was heated to 135° F. and then the Et$_3$Al (80 mm) ethyl p-t-butylbenzoate (23 mm) and the Ti$^{4+}$ phenol modified catalyst (0.8 g=20 mg Ti) were added. The pressure at this point was 64 psig. No propylene had to be fed to maintain this pressure. After 15 minutes 400 g of ethylene were added rapidly. The pressure was now 86 psig. The temperature rose to 160° F. and was maintained at this point. After 30 minutes during which ethylene and propylene were fed at a 4/1 molar ratio to maintain the pressure, the reaction mass was dumped. The reactor was rinsed with hexane and the hexane added to the reaction mixture. Addition of isopropyl alcohol to short-stop the reaction was followed by addition of A0449 (trademark; antioxidant) and finally isolation of the polymer by steam floccing. The polymer was dried under vacuum. The yield of material was 2,070 g (100,000 g polymer/g of Ti). The % ethylene was 24 and I.V. in tetralin @ 135° C. was 5.30. The ML-4 @ 257° F. was 109.

The advantages of this catalyst are higher efficiency (lower amounts of catalyst cut catalyst cost and eliminate necessity to wash polymer cement) and the elimination of aging step in cocatalyst preparation.

EXAMPLE 27

This example illustrates the fact that only 70% or less of the propylene charged in the first step becomes polymerized in that step (as measured by determining total solids), leaving 30% or more available for the second step (EP) or third step (EP/P).

(16A) Charge 4000 g propylene, 40,000 g hexane and 600 g of total catalyst solution as previously described. Once polymerization starts additional propylene (1,105 g) is added continuously to maintain pressure. At the end of this first step the total solids is 1252 g of polypropylene.

$$\frac{1252 \text{ g polypropylene}}{5105 \text{ g propylene monomer charged}} \times 100 = 24.5\% \text{ of propylene used in first step.}$$

Further additions of propylene are added later together with ethylene to form EP and again in the third step to form more polypropylene.

(16B) Charge 4000 g propylene, 40,000 g hexane and 560 g of total catalyst solution. Add an additional 1,690 g propylene during the first step to maintain pressure. 1295 g of polypropylene is formed.

$$\frac{1295 \text{ g polypropylene}}{5690 \text{ g propylene charged}} \times 100 = 23\% \text{ propylene used in first step}$$

What is claimed is:

1. A method of making a thermoplastic elastomeric sequential polymer comprising (a) contacting propylene under polymerization conditions with a polymerization catalyst system which produces polypropylene in which at least some of the polymer molecules have living polymer ends with a short life, said catalyst system comprising a catalyst which is titanium halide or a complex thereof with an electron donor supported on a magnesium or manganese halide and a cocatalyst which is an organo aluminum compound or a substitution product or addition product thereof with an electron donor, thereafter (b) adding ethylene and propylene to the polymerization mixture to form amorphous ethylene-propylene copolymer segments sequentially therein, the resulting polymer having (A) crystalline polypropylene segments of isotactic polypropylene and (B) amorphous segments of elastomeric ethylene-propylene, the weight ratio (A) to (B) segments being within the range of from 10:90 to 75:25.

2. A method as in claim 1 in which the polypropylene segments (A) comprise 15–70% by weight of the total polymerized propylene.

3. A method as in claim 1 in which less than 50% by weight of the propylene charged in step (a) is converted to polypropylene.

4. A method as in claim 1 in which not more than 30% by weight of the propylene charged step (a) is converted to polypropylene.

5. A method as in claim 1 wherein said catalyst is the reaction product of titanium tetrachloride with an alkyl benzoate supported on an anhydrous magnesium dihalide; and said cocatalyst is a trialkyl aluminum modified by reaction with an electron rich substituted benzoate.

6. A method as in claim 1 wherein said catalyst is the reaction product of titanium tetrachloride with phenol supported on an anhydrous magnesium dihalide; and said cocatalyst is a trialkyl aluminum modified by reaction with an electron rich substituted benzoate.

7. A method as in claim 5 in which (a) is ground to a particle size below 1 micron, the alkyl benzoate is ethyl benzoate, the magnesium dihalide is magnesium dichloride, the trialkyl aluminum is triethyl aluminum, the electron-rich substituted benzoate is ethyl anisate or ethyl p-t-butyl benzoate, the molar ratio of titanium tetrachloride to alkyl benzoate in the catalyst (a) is 1.1 to 1, the weight ratio of $MgCl_2$ to complexed titanium compound is at least 4 to 1, the molar ratio of trialkyl aluminum to benzoate in the cocatalyst (b) is from 2:1 to 10:1 and the molar ratio of aluminum to titanium is from 50 to 1 to 200 to 1.

8. A method as in claim 7 in which the said electron-rich substituted benzoate is ethyl p-t-butyl benzoate.

9. A method as in claim 6 in which (a) is ground to a particle size below 1 micron, the magnesium dihalide is magnesium dichloride, the phenol is phenol itself, the trialkyl aluminum is triethyl aluminum, the electron-rich substituted benzoate is ethyl anisate or ethyl p-t-butylbenzoate, the weight ratio of magnesium dichloride to phenol is from 4:1 to 100:1, the molar ratio of magnesium dichloride to titanium tetrachloride is from 2000:1 to 14:1, and the mole ratio of aluminum to titanium is at least 2:1.

10. A method as in claim 7 in which the polymerization temperature is from 20° to 80° C. in step (a) and from −10° to 80° C. in step (b).

11. A method as in claim 1 including the additional step, step (c), of adding propylene to the reaction mixture whereby the resulting polymer includes additional crystalline segments of isotactic polypropylene.

12. A method as in claim 11 in which the polymerization temperature is from 55° to 77° C. in step (a), from 60° to 77° C. in step (b) and from 60° to 77° C. in step (c).

13. A method as in claim 9 in which the polymerization temperature is from 20° to 80° C. in step (a) and from −10° to 80° C. in step (b).

14. A method as in claim 11 in which the polymerization temperature is from 55° to 77° C. in step (a), from 60° to 77° C. in step (b) and from 60° to 77° C. in step (c).

* * * * *